(12) United States Patent
Koshelev et al.

(10) Patent No.: US 11,609,370 B2
(45) Date of Patent: *Mar. 21, 2023

(54) WAVEGUIDE ILLUMINATOR HAVING WAVEGUIDE ARRAY

(71) Applicant: Meta Platforms Technologies, LLC, Menlo Park, CA (US)

(72) Inventors: Alexander Koshelev, Redmond, WA (US); Giuseppe Calafiore, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,061

(22) Filed: Sep. 24, 2021

(65) Prior Publication Data

US 2023/0014790 A1    Jan. 19, 2023

Related U.S. Application Data

(60) Provisional application No. 63/222,224, filed on Jul. 15, 2021.

(51) Int. Cl.
*F21V 8/00* (2006.01)
*G02B 27/10* (2006.01)
(Continued)

(52) U.S. Cl.
CPC ......... *G02B 6/0036* (2013.01); *G02B 6/0023* (2013.01); *G02B 6/0055* (2013.01);
(Continued)

(58) Field of Classification Search
CPC ...... G02B 6/0036; G02B 6/0061; G02B 6/24; G02B 6/2804; G02B 6/34; G02B 2006/12107; G02B 27/0944
(Continued)

(56) References Cited

U.S. PATENT DOCUMENTS 5,911,018 A    6/1999    Bischel et al.
6,201,913 B1   3/2001    Yi et al.
(Continued)

FOREIGN PATENT DOCUMENTS

CN    106405450 A    2/2017
EP    3819688 A1     5/2021
(Continued)

OTHER PUBLICATIONS

Teng S., et al., "Uniform Theory of the Talbot Effect with Partially Coherent Light Illumination," Journal of the Optical Society of America. A, Optics, image science, and vision, Sep. 2003, vol. 20, No. 9, pp. 1747-1754.
(Continued)

*Primary Examiner* — Keith G. Delahoussaye
(74) *Attorney, Agent, or Firm* — Pequignot + Myers; Matthew A. Pequignot

(57) ABSTRACT

A waveguide illuminator includes an input waveguide, a waveguide splitter coupled to the input waveguide, and a waveguide array coupled to the waveguide splitter. The waveguide array includes an array of out-couplers out-coupling portions of the split light beam to form an array of out-coupled beam portions for illuminating a display panel. Locations of the array of out-couplers are coordinated with locations of individual pixels of the display panel, causing each light beam portion to propagate through a corresponding pixel of the display panel, thereby improving efficiency of light utilization by the display panel.

20 Claims, 11 Drawing Sheets

(51) Int. Cl.
  *G02B 27/01* (2006.01)
  *G02B 6/124* (2006.01)
  *G02B 27/09* (2006.01)
  *G02B 6/12* (2006.01)
  *G02B 6/125* (2006.01)
  *G02B 6/28* (2006.01)

(52) U.S. Cl.
  CPC ....... *G02B 6/0078* (2013.01); *G02B 6/12004* (2013.01); *G02B 6/124* (2013.01); *G02B 6/125* (2013.01); *G02B 6/12007* (2013.01); *G02B 6/2804* (2013.01); *G02B 27/017* (2013.01); *G02B 27/0172* (2013.01); *G02B 27/0944* (2013.01); *G02B 27/0994* (2013.01); *G02B 27/10* (2013.01); *G02B 27/106* (2013.01)

(58) Field of Classification Search
  USPC .................................................... 385/10, 14
  See application file for complete search history.

(56) References Cited

U.S. PATENT DOCUMENTS

| | | | |
|---|---|---|---|
| 7,468,838 | B2 | 12/2008 | Cha et al. |
| 10,613,410 | B2 | 4/2020 | Hosseini et al. |
| 10,684,404 | B2 | 6/2020 | Fattal |
| 2005/0089277 | A1 | 4/2005 | Ishida |
| 2011/0274438 | A1 | 11/2011 | Fiorentino et al. |
| 2013/0155477 | A1 | 6/2013 | Yankov et al. |
| 2014/0314374 | A1 | 10/2014 | Fattal et al. |
| 2017/0090096 | A1 | 3/2017 | Fattal |
| 2017/0139110 | A1 | 5/2017 | Woodgate et al. |
| 2017/0299793 | A1 | 10/2017 | Fattal |
| 2018/0107091 | A1* | 4/2018 | Hosseini ................ G02F 1/292 |
| 2018/0113419 | A1 | 4/2018 | Stafford |
| 2018/0152680 | A1 | 5/2018 | Zimmerman et al. |
| 2019/0155105 | A1 | 5/2019 | Aieta et al. |
| 2020/0271850 | A1 | 8/2020 | Vora et al. |
| 2022/0236486 | A1* | 7/2022 | Muñoz Muñoz .......................... G02B 27/0087 |

FOREIGN PATENT DOCUMENTS

| | | |
|---|---|---|
| WO | 2020041067 A1 | 2/2020 |
| WO | 2022120250 A1 | 6/2022 |
| WO | 2022120253 A1 | 6/2022 |

OTHER PUBLICATIONS

International Search Report and Written Opinion for International Application No. PCT/US2022/036056, dated Sep. 8, 2022, 13 pages.

International Search Report and Written Opinion for International Application No. PCT/US2022/036058, dated Nov. 9, 2022, 12 pages.

International Search report and Written Opinion for International Application No. PCT/US2022/036987, dated Oct. 19, 2022, 11 pages.

International Search report and Written Opinion for International Application No. PCT/US2022/037012, dated Nov. 15, 2022, 11 pages.

International Search Report and Written Opinion for International Application No. PCT/US2022/037357 dated Sep. 23, 2022, 11 pages.

* cited by examiner

WAVEGUIDE ILLUMINATOR HAVING WAVEGUIDE ARRAY

REFERENCE TO RELATED APPLICATION

This application claims priority from U.S. Provisional Patent Application No. 63/222,224 entitled "Single Mode Backlight Illuminator", filed on Jul. 15, 2021 and incorporated herein by reference in its entirety.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses and other optical elements in the image forming train.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
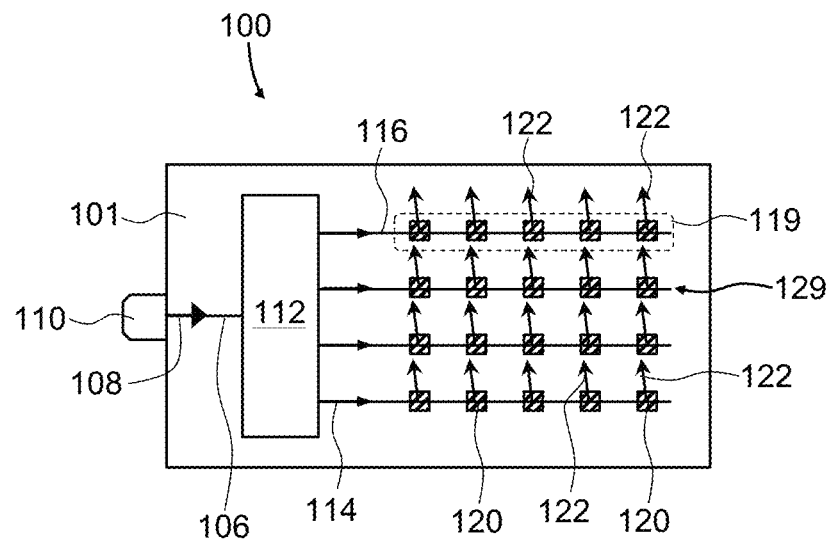
FIG. 1 is a schematic plan view of a waveguide illuminator of the present disclosure.
Figure 7:
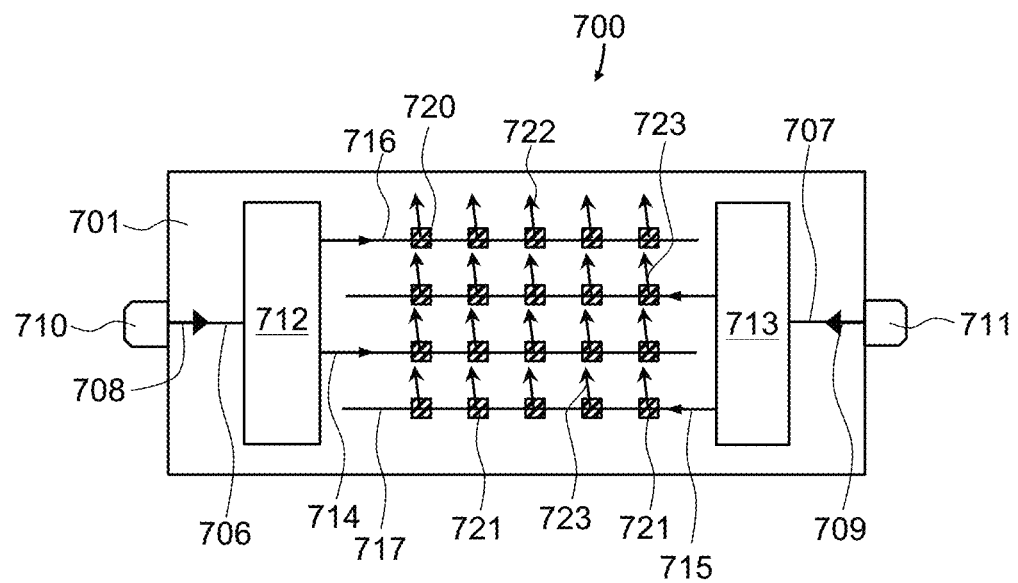
FIG. 7 is a schematic plan view of a waveguide illuminator having interlaced output waveguide arrays.
Figure 8:
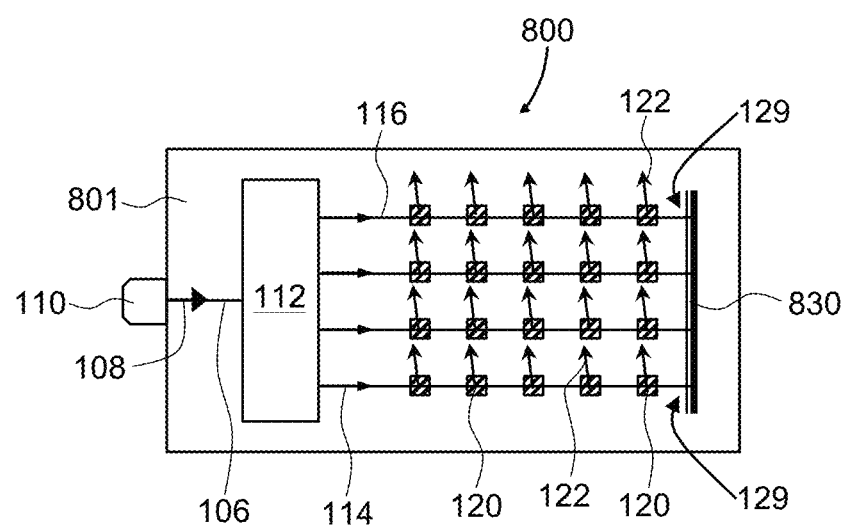
FIG. 8 is schematic plan view of a waveguide illuminator having a reflector at an end of the output waveguide array.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 7, and 8, similar number refer to similar elements. Also in FIGS. 3A, 3B to FIGS. 6A, 6B, similar number refer to similar elements.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, light utilization and wall plug efficiency of a backlit display may be improved by providing a waveguide illuminator including an array of out-couplers aligned with pixels of the display panel. In displays where the illuminator emits light of primary colors, e.g. red, green, and blue, the color of the illuminating light may be matched to the color filters, or the color filters may be omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to considerably improve the useful portion of display light that is not absorbed or reflected by the display panel on its way to the eyes of the viewer, and consequently to considerably improve the display's wall plug efficiency.

Singlemode or few-mode waveguides, e.g. ridge waveguides, in combination with laser illumination allow for efficient control of such light properties as color and directivity. As light propagates in a single spatial mode, the output can be diffraction-limited and highly directional. Single mode propagation also allows one to out-couple light in specific points on the waveguide and incorporate focusing pixels that can focus light into the pixels of a display panel while avoiding scattering in inter-pixel areas. The narrow spectrum of laser illumination enables large color gamut displays. Furthermore, single mode waveguides may preserve polarization, which results in highly polarized output from the backlight unit without the need of polarizer.

In accordance with the present disclosure, there is provided a waveguide illuminator comprising a first input waveguide for guiding a first input light beam in the first input waveguide, a first waveguide splitter coupled to the first input waveguide for splitting the first input light beam into a first plurality of sub-beams, and a first waveguide array coupled to the first waveguide splitter for propagating the sub-beams of the first plurality, waveguides of the first waveguide array running parallel to one another. Each waveguide of the first waveguide array is configured to guide a sub-beam of the first plurality from the first waveguide splitter to an end of the waveguide. The waveguide illuminator further includes a first array of rows of out-couplers, each row of out-couplers of the first array being coupled to a waveguide of the first waveguide array along a length of the waveguide, for out-coupling portions of the sub-beam propagating in the waveguide, to form a first two-dimensional array of sub-beam portions out-coupled from the first waveguide array.

The out-couplers of each row of the first array of rows of out-couplers may have an out-coupling efficiency gradually increasing with distance from the first waveguide splitter, for flattening a spatial distribution of optical power of the first two-dimensional array of the out-coupled sub-beam portions. In embodiments where the out-couplers of the first array of rows of out-couplers comprise grating out-couplers, the latter may have at least one of a grating duty cycle or a grating height varying with the distance from the first waveguide splitter, for flattening the spatial distribution of the optical power of the first two-dimensional array of out-coupled sub-beam portions. To that end, the grating out-couplers may have a thickness adiabatically decreasing with the distance from the first waveguide splitter; a grating length varying with the distance from the first waveguide splitter; and/or a ratio of a lateral width of the grating out-couplers to a width of the waveguides may vary with the distance from the first waveguide splitter.

In some embodiments, the waveguide illuminator further includes a second input waveguide for guiding a second input light beam in the second input waveguide, a second waveguide splitter coupled to the second input waveguide for splitting the second input light beam into a second plurality of sub-beams, and a second waveguide array coupled to the second waveguide splitter for propagating the sub-beams of the second plurality, waveguides of the second waveguide array running parallel to one another. Each waveguide of the second waveguide array may be configured to guide a sub-beam of the second plurality. The waveguide illuminator may further include a second array of rows of out-couplers, each row of out-couplers of the second array being coupled to a waveguide of the second waveguide array along a length of the waveguide, for out-coupling portions of the sub-beam propagating in the waveguide, to form a second two-dimensional array of out-coupled sub-beam portions. The first and second waveguide arrays may be interleaved. In operation, the sub-beams of the first and second pluralities propagate in opposite directions in respective waveguides.

In some embodiments, the waveguide illuminator further includes a reflector at the ends of the waveguides of the first waveguide array, for reflecting the sub-beams to propagate back towards the first waveguide splitter. The reflector may run across the waveguides of the first waveguide array and may include a Bragg reflector and/or a metal-coated etched groove mirror.

In some embodiments, the waveguide illuminator further includes first, second, and third in-couplers for coupling into the waveguide illuminator light of first, second, and third color channels respectively, and a wavelength multiplexor coupled to the first, second, and third in-couplers for combining the light of the first, second, and third color channels into the first input light beam, and for coupling the first input light beam into the first input waveguide. In such embodiments, the first waveguide splitter may include a 1×N splitter for splitting the first input light beam into N portions each propagating in one of N output waveguides, where N is an integer, and N wavelength demultiplexors each coupled to a particular one of the N output waveguides, for separating light of the first, second, and third color channels to propagate in different waveguides of the first waveguide array.

In accordance with the present disclosure, there is provided a display device comprising a waveguide illuminator of this disclosure and a display panel comprising an array of display pixels disposed and configured to receive the array of the out-coupled sub-beam portions. A pitch of the display pixels may be substantially, e.g. to within 1%, equal to a pitch of the array of rows of out-couplers. The display device may further include a light source for providing the input light beam to the input waveguide. The light source may be a polarized light source, such that the input light beam and the out-coupled sub-beam portions are polarized. The light source may include a monochromatic light source, the input light beam having a wavelength of a color channel.

In accordance with the present disclosure, there is further provided a method for illuminating a display panel. The method comprises guiding a first input light beam in a first input waveguide of a waveguide illuminator, splitting the first input light beam into a first plurality of sub-beams using a first waveguide splitter, guiding the first plurality of sub-beams parallel to one another in a first waveguide array of the waveguide illuminator, and out-coupling portions of the sub-beams of the first plurality using a first array of rows of out-couplers, each row of out-couplers being coupled to a waveguide of the first waveguide array, to form a first two-dimensional array of out-coupled sub-beam portions. Out-couplers of each row of the first array of rows of out-couplers may have an out-coupling efficiency gradually increasing with distance from the first waveguide splitter, for flattening a spatial distribution of optical power of the first two-dimensional array of out-coupled sub-beam portions.

The method may further include guiding a second input light beam in a second input waveguide of the waveguide illuminator, splitting the second input light beam into a second plurality of sub-beams using a second waveguide splitter, guiding the second plurality of sub-beams parallel to one another in a second waveguide array of the waveguide illuminator, and out-coupling portions of the sub-beams of the second plurality using a second array of rows of out-couplers, each row of out-couplers being coupled to a waveguide of the second waveguide array, to form a second two-dimensional array of out-coupled sub-beam portions. The first and second waveguide arrays are interleaved, and the sub-beams of the first and second pluralities of sub-beams propagate in respective waveguides in opposite directions.

Referring now to FIG. 1, a waveguide illuminator 100 includes a substrate 101 supporting an input waveguide 106 for guiding an input light beam 108 provided by a light source 110, e.g. a laser source. Herein, the term "waveguide" denotes a light guiding structure that bounds the light propagation in two dimensions, like a light wire, and guides the light in a single transversal mode, or in several transversal modes, e.g. up to 12 modes of propagation. A waveguide may be straight, curved, etc. One example of a linear waveguide is a ridge-type waveguide. The waveguide illuminator 100 may be implemented in a photonic integrated circuit (PIC).

A waveguide splitter 112 is coupled to the input waveguide 106. The function of the waveguide splitter 112 is to split the input light beam 108 into a plurality of sub-beams 114. An array of waveguides 116 is coupled to the waveguide splitter 112 for guiding the sub-beams 114 in the waveguides 116. The waveguides 116 run parallel to one another as illustrated. Each waveguide 116 is configured to guide one of the sub-beams 114 from the waveguide splitter 112 to an end 129 of the waveguide 116.

An array of rows 119 of out-couplers 120 is supported by the substrate 101 of the waveguide illuminator 100. Each row 119 of the out-couplers 120 is coupled to a waveguide 116 of the waveguide array along a length of the waveguide 116, for out-coupling portions 122 of one of the sub-beams 114 propagating in the waveguide 116. The portions 122 out-coupled by all rows 119 of the out-couplers 120 form a two-dimensional array of the sub-beam portions 122 out-coupled from the waveguide array and exiting at an angle, e.g. an acute or straight angle, to the substrate 101. X- and Y-pitch of the two-dimensional array of the sub-beam portions 122 may be selected to match X- and Y-pitch of a display panel illuminated by the waveguide illuminator 100.

Figure 2A:
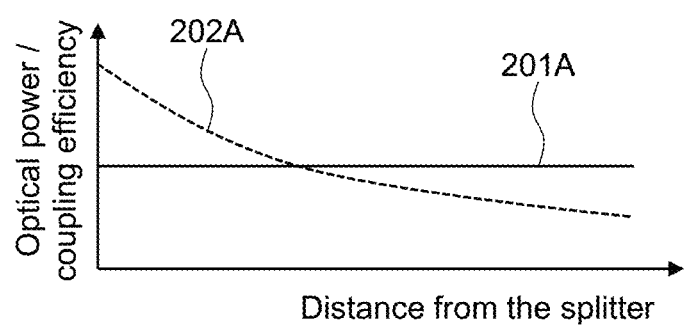
FIG. 2A is a combined plot of out-coupling efficiency and out-coupled optical power vs. distance the light traveled in waveguides of the illuminator of FIG. 1, for the case of spatially uniform out-coupling efficiency.
Figure 2B:
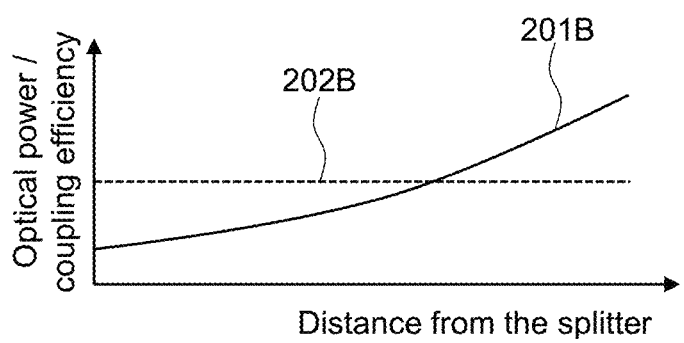
FIG. 2B is a combined plot of out-coupling efficiency and out-coupled optical power vs. distance the light traveled in waveguides of the illuminator of FIG. 1, for the case of spatially non-uniform out-coupling efficiency.

When out-coupling efficiency of all out-couplers 120 is the same along any of the rows 119 as indicated by a straight solid line 201A in FIG. 2A, the out-coupled optical power of the sub-beam portions 122 exponentially reduces with distance from the waveguide splitter 112 as indicated by an exponential dashed line 202A. This happens because with each out-coupling, the sub-beam 114 loses power, and accordingly, a same out-coupled percentage of the lesser power results in a lesser out-coupled optical power of the next sub-beam portion 122. In many applications, it is desirable to have the optical power of all sub-beam portions 122 at a same level. To that end, the out-couplers 120 of each row 119 of out-couplers may be made to have the out-coupling efficiency gradually increasing with distance from the waveguide splitter 112 as indicated in FIG. 2B by a curved solid line 201B, for evening out or flattening a spatial distribution of optical power of the two-dimensional array of out-coupled sub-beam portions 120, as indicated by a dashed straight line 202B.

The gradual increase of the out-coupling efficiency may be achieved in a number of ways, depending on the out-coupler type. For evanescent out-couplers, the distance between the out-coupling element and the waveguides 116 may be gradually reduced with distance from the splitter 112. For out-couplers based on diffraction gratings, not only the distance between the waveguide and out-coupler but parameters such as grating duty cycle, length, height, and/or width may be varied from grating to grating.

Figure 3A:
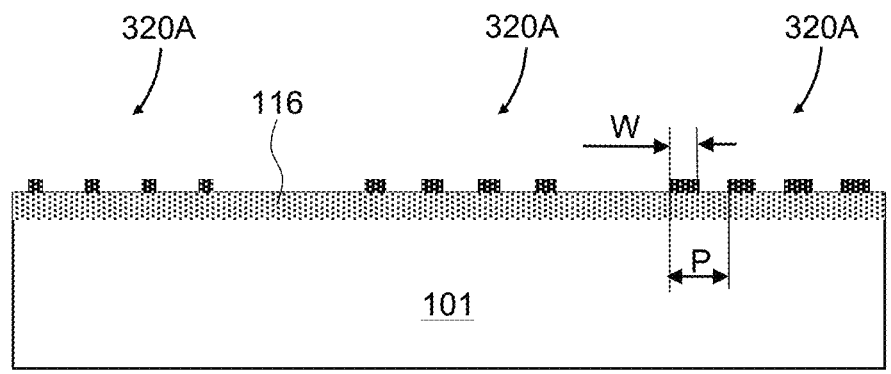
FIG. 3A is a side cross-sectional magnified view of a waveguide illuminator embodiment with grating out-couplers having a spatially varying duty cycle.

FIG. 3A presents a non-limiting illustrative embodiment of the waveguide illuminator of FIG. 1. A longitudinal cross-sectional view along one of the waveguides 116 of FIG. 1 shows a duty cycle of grating out-couplers 320A (a variant of the out-couplers 120; three are shown) changing with the distance from the first waveguide splitter. The duty cycle, defined as a ratio of a grating fringe width W to a grating pitch P, increases in going from left to right. As the duty cycle increases, the strength of the out-coupling, or the out-coupling efficiency increases, which facilitates evening out the spatial distribution of the optical power of the two-dimensional array of out-coupled sub-beam portions 122. Herein, the term "evening out" or "flattening" means facilitating the reduction of variation of optical power level between different out-coupled sub-beam portions 122.

Figure 3B:
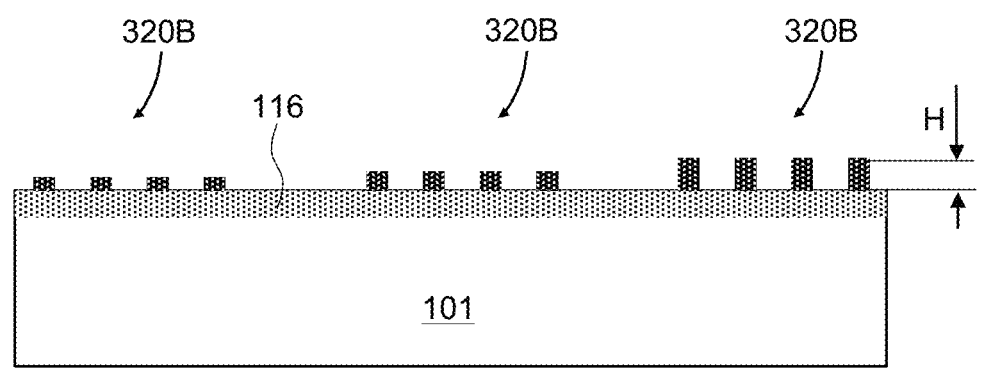
FIG. 3B is a side cross-sectional magnified view of a waveguide illuminator embodiment with grating out-couplers having a spatially varying grating height.

Turning to FIG. 3B, a longitudinal cross-sectional view along one of the waveguides 116 of FIG. 1 shows grating out-couplers 320B, which are embodiments of the out-couplers 120 in FIG. 1. A height H of the grating out-couplers 320B changes with the distance from the first waveguide splitter. The height H increases in going from left to right. As the height H increases, the strength of the out-coupling, or the out-coupling efficiency increases, which facilitates evening out the spatial distribution of the optical power of the two-dimensional array of out-coupled sub-beam portions 122.

Figure 4:
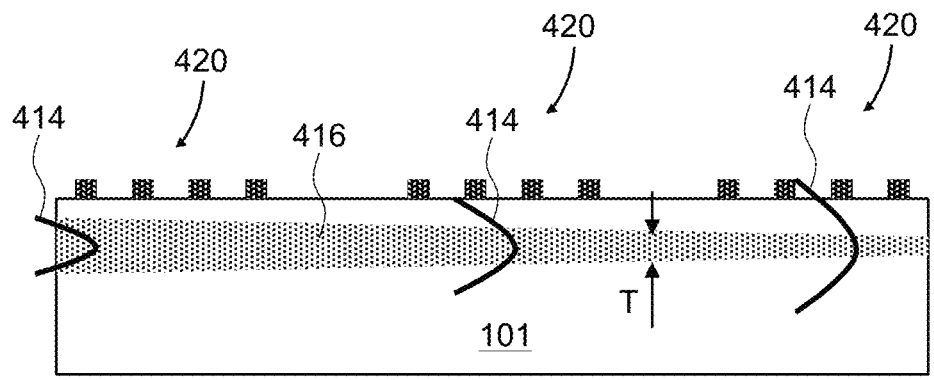
FIG. 4 is a side cross-sectional magnified view of a waveguide illuminator embodiment with the waveguide having a spatially varying thickness.

Referring to FIG. 4, a longitudinal cross-sectional view along waveguides of the waveguide illuminator 100 of FIG. 1 shows a waveguide 416 and out-coupling gratings 420 as example embodiments of the waveguides 116 and the out-couplers 120, respectively, of the waveguide illuminator 100. The waveguide 416, and other waveguides of the waveguide array, have a thickness T adiabatically decreasing with the distance from the waveguide splitter (i.e. left to right in FIG. 4). The gradual reduction of the waveguide 416 thickness results in an adiabatic broadening of a propagating optical mode 414, which results in a gradual increase of the out-coupling efficiency of the out-coupling gratings 420, evening out the spatial distribution of the optical power of the two-dimensional array of the out-coupled sub-beam portions 120 (FIG. 1). This embodiments is also operational with evanescent out-couplers.

Figure 5:
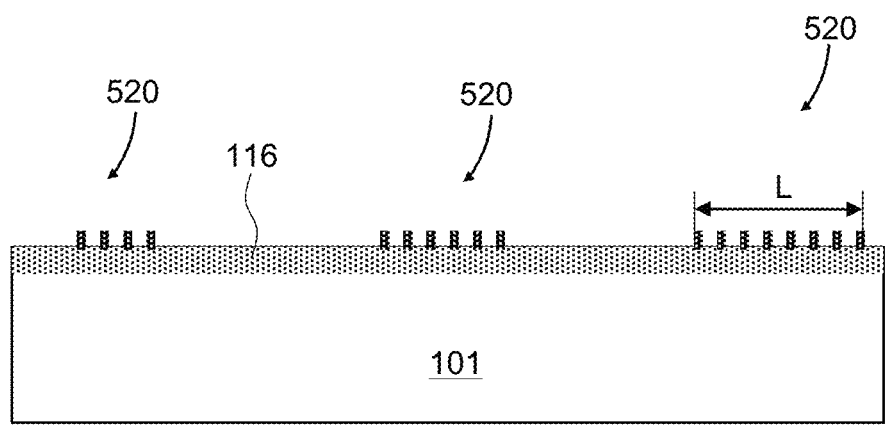
FIG. 5 is a side cross-sectional magnified view of a waveguide illuminator embodiment with grating out-couplers having a spatially varying grating length.

Referring now to FIG. 5, a longitudinal cross-sectional view along waveguides of the waveguide illuminator 100 of FIG. 1 depicts out-coupling gratings 520 as embodiments of the out-couplers 120 of the waveguide illuminator 100. The out-coupling gratings 520 have a grating length L increasing with the distance from the waveguide splitter (i.e. left to right in FIG. 5). The gradual increase of the grating length L results in a gradual increase of the out-coupling efficiency of the out-coupling gratings 520, evening out the spatial distribution of the optical power of the two-dimensional array of the out-coupled sub-beam portions 120 shown in FIG. 1.

Figure 6A:
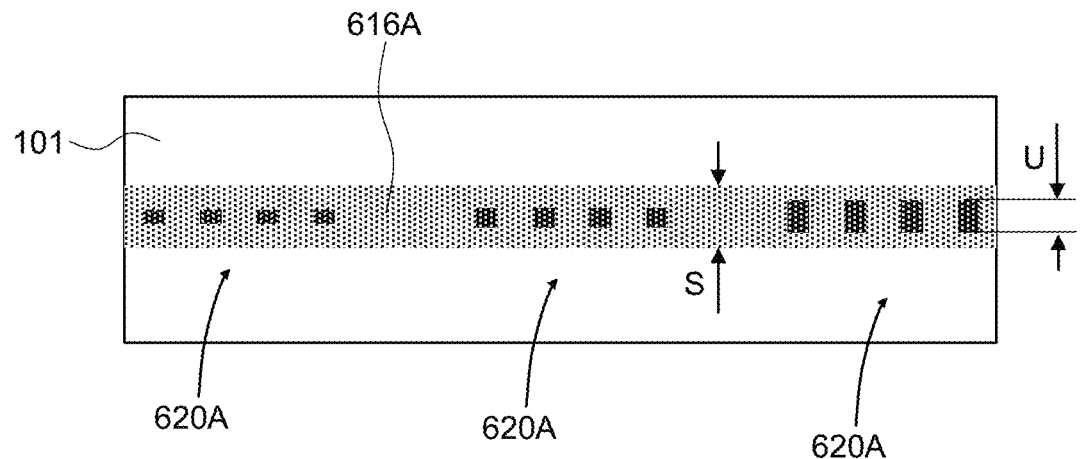
FIG. 6A is a magnified top view of a waveguide illuminator embodiment with grating out-couplers, the grating out-couplers having a spatially varying grating width.
Figure 6B:
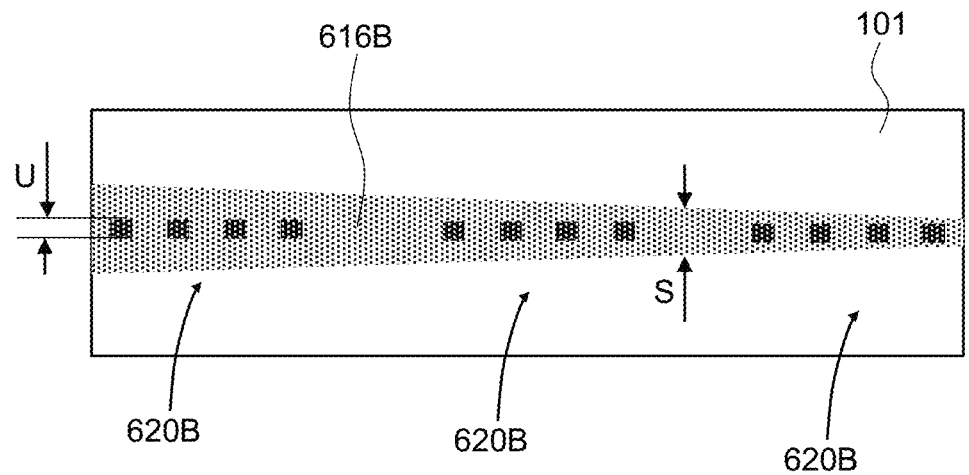
FIG. 6B is a magnified top view of a waveguide illuminator embodiment with the waveguide having a spatially varying width.

Referring to FIG. 6A, a waveguide 616A and grating out-couplers 620A are embodiments of the waveguide 116 and the out-couplers 120, respectively, of the waveguide illuminator 100 of FIG. 1. The waveguide 616A is illustrated in plan view. The grating out-couplers 620A have a lateral grating width U increasing with the distance from the waveguide splitter, i.e. left to right in FIG. 6A, the waveguide width S remaining constant. FIG. 6B illustrates another variant where grating out-couplers 620B have the constant lateral grating width U, while a waveguide 616B width S adiabatically decreases with the distance from the waveguide splitter, i.e. left to right in FIG. 6B. In both cases, a gradual increase of a ratio of the lateral grating width U relative to the waveguide width S results in a gradual increase of the out-coupling efficiency of the out-coupling gratings 620B, evening out the spatial distribution of the optical power of the two-dimensional array of the out-coupled sub-beam portions 120.

Turning now to FIG. 7, a waveguide illuminator 700 is similar to the waveguide illuminator 100 of FIG. 1, includes similar elements, and may be implemented as a PIC. Similarly to the waveguide illuminator 100, the waveguide illuminator 700 of FIG. 7 includes a substrate 701 supporting a first input waveguide 706 for guiding a first input light beam 708 provided by a first light source 710, e.g. a laser source. A first waveguide splitter 712 is coupled to the first input waveguide 706. The function of the first waveguide splitter 712 is to split the first input light beam 708 into a first plurality of sub-beams 714. A first array of waveguides 716 is coupled to the first waveguide splitter 712 for propagating the sub-beams 714 in the waveguides 716 of the first array. The waveguides 716 run parallel to one another as illustrated. Each waveguide 716 is configured to guide one of the sub-beams 714. A first array of out-couplers 720, arranged in rows corresponding to individual waveguides 716, is supported by the substrate 701. Each row of the out-couplers 720 is coupled to one waveguide 716 of the first waveguide array along a length of the waveguide 716, for out-coupling portions 722 of one of the sub-beams 714 propagating in the waveguides 716. The portions 722 form a first two-dimensional array of out-coupled sub-beam portions.

The waveguide illuminator 700 further includes a second input waveguide 707 for guiding a second input light beam 709 provided by a second light source 711, e.g. a laser source, at an opposite side of the substrate 701. A second waveguide splitter 713 is coupled to the second input waveguide 707 for splitting the second input light beam 709 into a second plurality of sub-beams 715. A second array of waveguides 717 is coupled to the second waveguide splitter 713 for propagating the sub-beams 715 in the waveguides 717. The waveguides 717 of the second waveguide array run parallel to one another and between the waveguides 716 of the first waveguide array. Each waveguide 717 of the second waveguide array is configured to guide one sub-beam 715. A second array of out-couplers 721, arranged in rows, is supported by the substrate 701. Each row of out-couplers 721 is coupled to one of the waveguides 717 of the second waveguide array along the length of the waveguides 717, for out-coupling portions 723 forming a second two-dimensional array of out-coupled sub-beam portions. The first 708 and second 709 input light beams may be launched into the respective interleaved waveguide arrays from the two opposite sides of the waveguide illuminator 700 along the pairs of parallel waveguides 716, 717. In some embodiments, the first 708 and second 709 input light beams are launched into the same waveguides 716 and/or 717. The first 708 and second 709 input light beams can be from a same laser source, with sufficient path delay to avoid interference anywhere inside the output area. The two arrays of the out-coupled beam portions 722 and 723 are interleaved, which is a consequence of the waveguides 716 and 717 of the first and second waveguide arrays, and corresponding out-couplers 720 and 721 being interleaved as illustrated. The sub-beams 714 and 715 split from the first 708 and second 709 input light beams propagate in opposite directions. The interleaved configuration illustrated in FIG. 7 allows one to reduce undesired optical interference effects between neighboring out-coupled beam portions 722 and 723.

Referring to FIG. 8, a waveguide illuminator 800 is similar to the waveguide illuminator 100 of FIG. 1, includes the elements described above with reference to FIG. 1, and may be implemented as a PIC. The waveguide illuminator 800 of FIG. 8 further includes an end reflector 830 at the ends 129 of the waveguides 116 of the waveguide array, for reflecting the sub-beams 114 propagated to the ends 129 to propagate back towards the waveguide splitter 112. In other words, the end reflector 830 runs across the waveguides 116 of the waveguide array. The out-coupler 120 may be relatively weak, e.g. out-coupling only ~50% of light. The mirror can be e.g. a Bragg reflector, or a metal-coated etched groove mirror i.e. a groove etched in a substrate 801 and metal-coated. The end reflector 830 may be placed far away from the output area, so that the path difference between forward and back propagating light waves is larger than a coherence length of the light source 110, for reduction of fringing due to optical interference.

Figure 9:
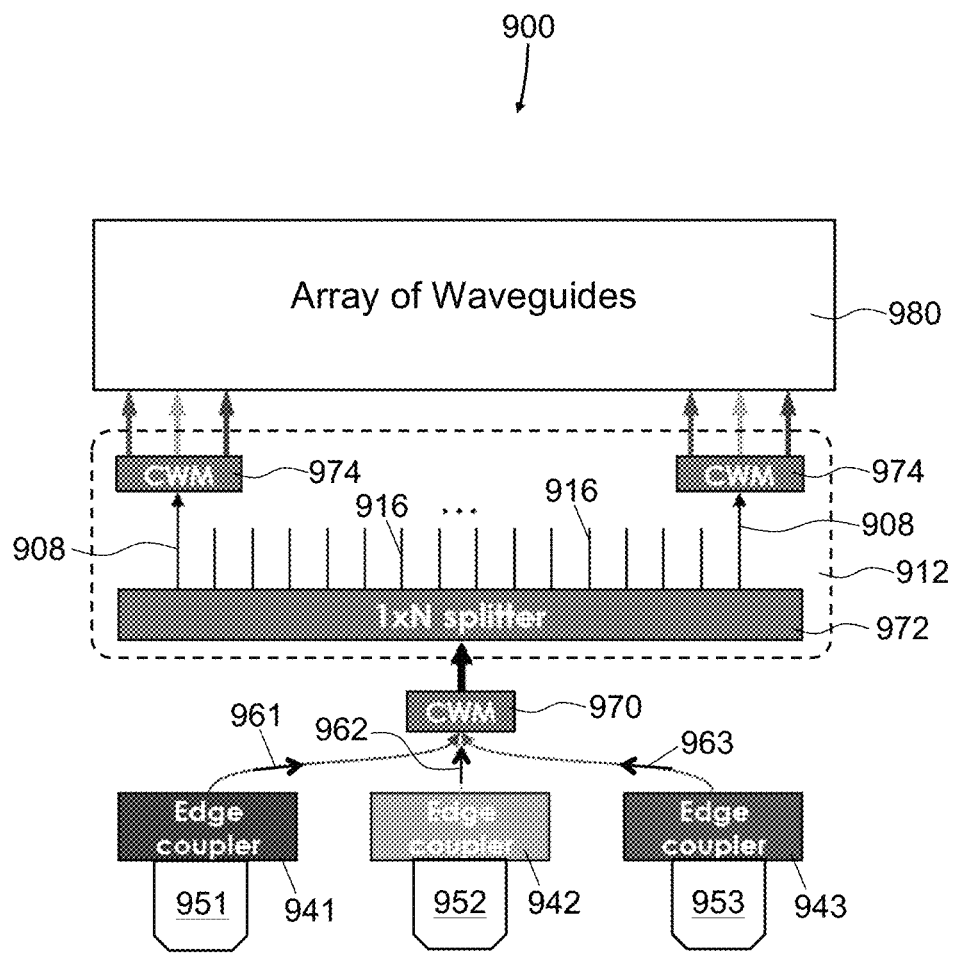
FIG. 9 is a schematic diagram of a multi-color embodiment of the waveguide illuminator of FIG. 1.

The configuration of the waveguide illuminator 100 presented in FIG. 1 may be adapted to provide multi-color illumination, e.g. for separate and color-matched illumination of red, green, and blue sub-pixels of a display panel. Referring for a non-limiting example to FIG. 9, a waveguide illuminator 900 is similar to the waveguide illuminator 100 of FIG. 1, includes similar elements, and may be implemented as a PIC. The waveguide illuminator 900 of FIG. 9 further includes first 941, second 942, and third 943 in-couplers, e.g. edge in-couplers, for coupling into the waveguide illuminator 900 light of first 951, second 952, and third 953 light sources e.g. laser sources. The first 951, second 952, and third 953 light sources may emit light 961, 962 and 963 of first, second, and third color channels respectively such as, for example, red light of a red color channel, green light of a green color channel, and blue light of a blue color channel.

A wavelength multiplexor 970 is coupled to the first 941, second 942, and third 943 in-couplers for combining the light 961, 962 and 963 of the first, second, and third color channels respectively into the input light beam 108, and coupling the input light beam 108 into the input waveguide 106. The abbreviation "CWM" in FIG. 9 denotes a "coarse" wavelength multiplexor, with wavelengths spaced by 20 nm or more. A waveguide splitter 912 is an embodiment of the waveguide splitter 112 of the waveguide illuminator 100 of FIG. 1. The waveguide splitter 912 of FIG. 9 includes a 1×N splitter 972, where N is an integer, for splitting the input light beam 108 into N portions 908 each propagating in one of N output waveguides 916. The a 1×N splitter 972 may include e.g. an array of 1×2 splitters arranged into a binary tree. The N portions 908 may all have a same optical power.

The waveguide splitter 912 further includes N wavelength demultiplexors 974 each coupled to a particular one of the N output waveguides 916, for separating light 961, 962 and 963 of the first, second, and third color channels respectively to propagate in different waveguides 116 of a waveguide array 980.

Figure 10:
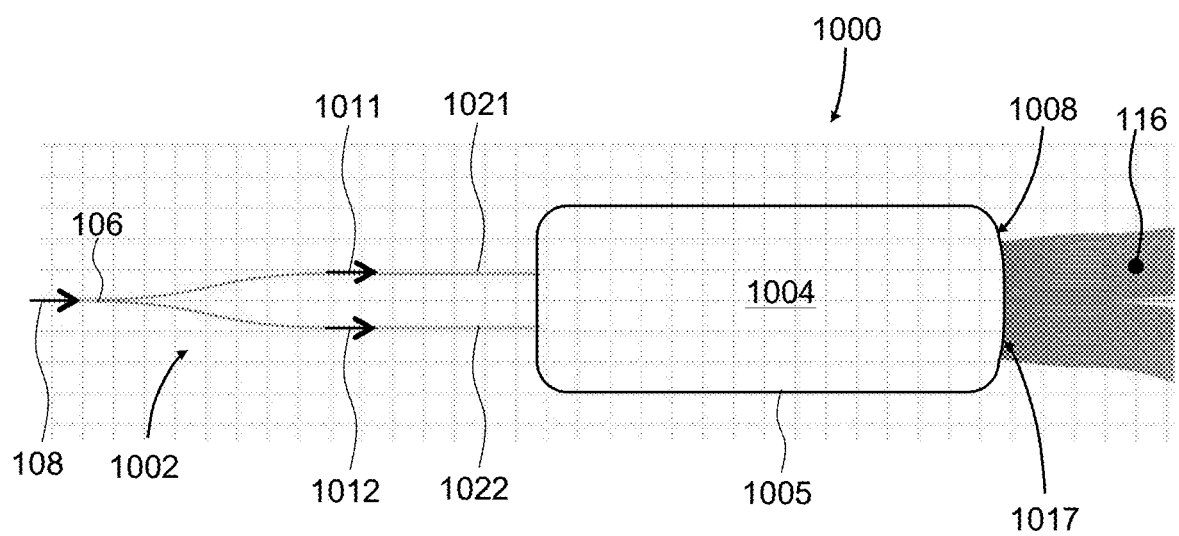
FIG. 10 is a plan view of a splitter of the waveguide illuminator of claim 1, according to an embodiment.

Referring momentarily back to FIG. 1, the function of the splitter 112 of the waveguide illuminator 100 is to split the input light beam 108 into the sub-beams 114. Many configurations for the splitter 112 are possible, for example a binary tree of 1×2 splitters or evanescent 2×2 couplers, a multimode interference (MMI) splitter, etc. Referring for a non-limiting example to FIG. 10, a splitter component 1000 includes a 1×2 waveguide splitter 1002 coupled to the plurality of waveguides 116 via a slab interference cavity 1004, which is a section of a slab waveguide having a perimeter 1005. Herein, the term "slab waveguide" or "slab waveguide structure" denotes a waveguide that bounds the light propagation in one dimension, typically a vertical dimension, i.e. across the thickness of the waveguide chip. The light can freely propagate in plane of the waveguide chip.

In operation, the 1×2 splitter 1002 splits the input light beam 108 into two portions 1011, 1012 of a substantially equal optical power. The portions 1011, 1012 propagate to the slab interference cavity 1004 in waveguides 1021, 1022. The portions 1011, 1012 expand in the slab interference cavity 1004, undergoing optical interference at an opposite side 1008 of the slab interference cavity 1004. Ends 129 of the waveguides 116 are disposed in areas of local interference maxima of the side 1008 of the slab interference cavity 1004. Areas of local interference minima are disposed between the ends 1017 of the waveguides 116, such that optical power of the input light beam 108 is not lost between the ends 1017 of the linear waveguides 116. The 1×2 splitter 1002 may be replaced with a larger splitter e.g. a 1×4 splitter coupled to the slab interference cavity 1004 for better concentration of the light into the waveguides 116.

Figure 11:
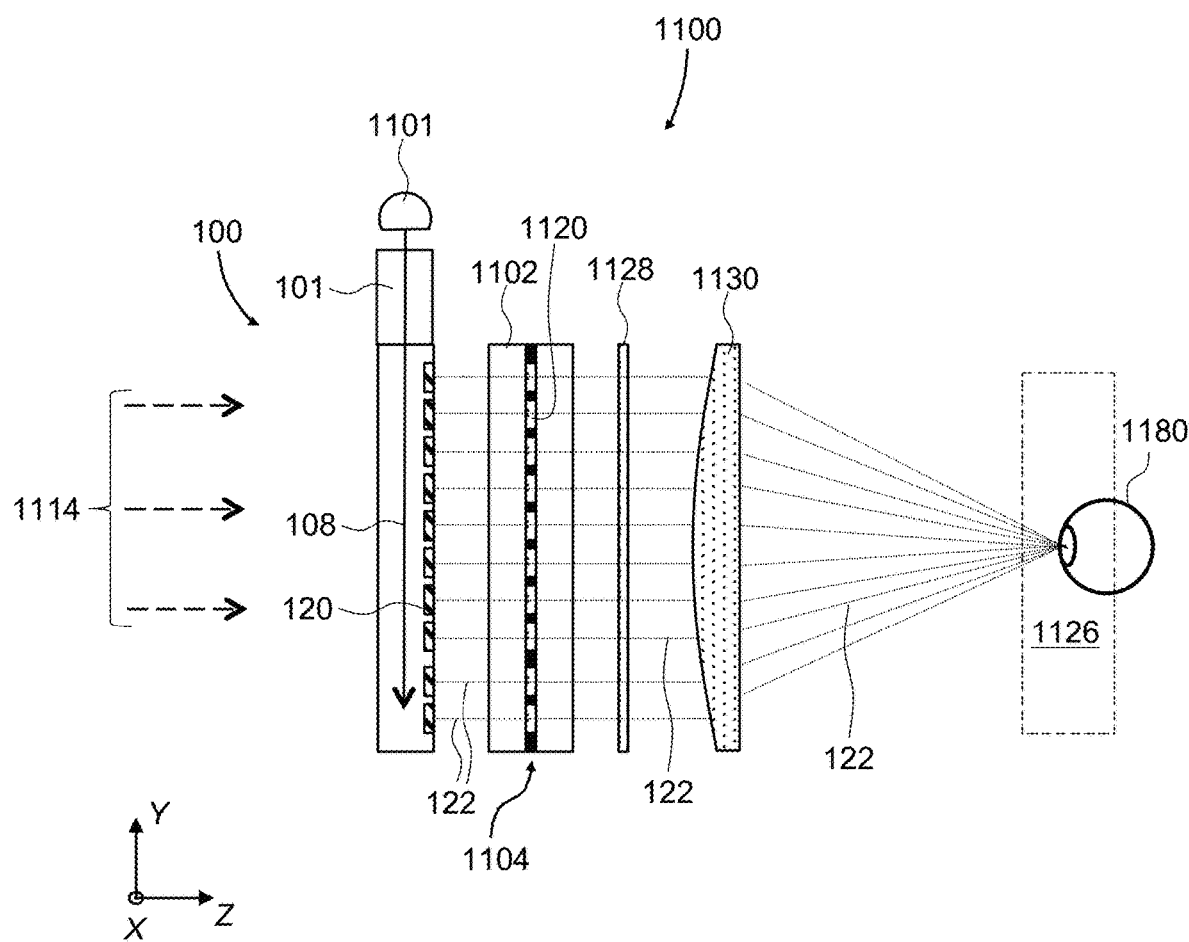
FIG. 11 is a schematic view of a near-eye display using the waveguide illuminator of FIG. 1.

Referring now to FIG. 11 with further reference to FIG. 1, a display device 1100 includes the waveguide illuminator 100 of FIG. 1, or any other waveguide illuminator disclosed herein, coupled to a display panel 1102 (FIG. 11). A light source 1101, e.g. a monochromatic light source at a wavelength of a color channel, may be optically coupled to the illuminator 100 for providing the light beam 108 to the illuminator 100. The display panel 1102 includes an array of display pixels 1120 disposed and configured to receive the array of the out-coupled sub-beam portions 122 from the illuminator 100. To ensure that the sub-beam portions 122 are used efficiently, locations and pitch of the display pixels 1120 may be matched to locations and pitch of the array of out-couplers 120, in both X- and Y-directions. A pitch of the display pixels 1120 may be substantially equal to a pitch of the array of the out-couplers 120.

The display panel 1102 may include a liquid crystal (LC) layer 1104, with the display pixels 1120 configured to controllably convert or tune a polarization state of the individual sub-beam portions 122, e.g. rotate a linear polarization state. In this embodiment, the light source 1101 may be a polarized light source emitting linearly polarized light. A linear polarizer 1128 may be provided to convert the polarization distribution of the sub-beam portions 122 imparted by the display pixels 1120 into an optical power density distribution representing an image to be displayed. The image is in linear domain, where pixel coordinates of the image being displayed correspond to XY coordinates of the display pixels 1120. An ocular lens 1130 may be used to convert the image in linear domain into an image in angular domain at an eyebox 1126 for direct observation by an eye 1180. Herein, the term "image in angular domain" refers to an image where pixel coordinates of the image being displayed correspond to ray angles of the sub-beam portions 122. In embodiments with tunable polarization rotators, the light source 1101 may emit polarized light, and the waveguide illuminator 100 may preserve that state of polarization. It is further noted that any of the waveguide illuminators disclosed herein may be used instead of the waveguide illuminator 100 of the display device 1100. The waveguide illuminator 100 may be made transparent to external light 1114.

Figure 12:
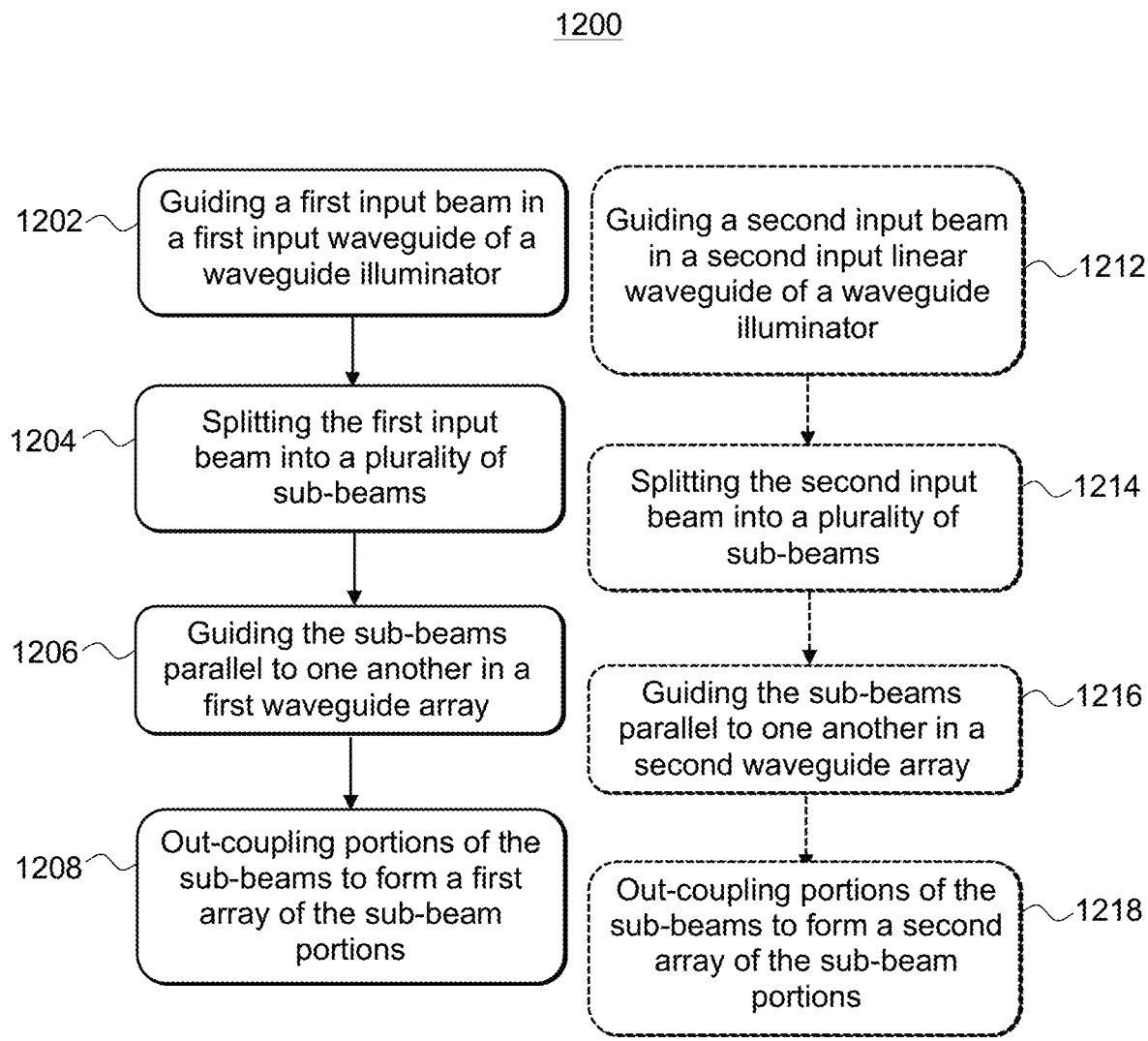
FIG. 12 is a flow chart of a method for illuminating a display panel in accordance with the present disclosure.

Referring to FIG. 12 with further reference to FIG. 1, a method 1200 for illuminating a display panel includes guiding (1202) a first input light beam, e.g. the light beam 108, in a first input waveguide, e.g. the input waveguide 106, of a waveguide illuminator, e.g. the waveguide illuminator 100 of FIG. 1. The first input light beam is split (FIG. 12; 1204) into a plurality of the sub-beams 114. The sub-beams 114 of the first input light beam 108 are guided (1206) parallel to one another in a first waveguide array of the waveguide illuminator of the waveguide illuminator 100. The portions 122 of the sub-beams are out-coupled (1208) using a first array of the rows 119 of the out-couplers 120. Each row 119 of the out-couplers 120 is coupled to one of the waveguides 116 of the first waveguide array. The out-coupled sub-beam portions 122 form a first two-dimensional array of out-coupled sub-beam portions.

In embodiments with multiple input light beams, the method 1200 may be performed for each light beam. Still referring to FIG. 12 with further reference now to FIG. 7, the method 1200 may further include guiding (1212) the second input light beam 709 (FIG. 7), e.g. the beam of a second color channel, in the second input waveguide 707 of the waveguide illuminator 700. The second input light beam 709 may be split (FIG. 12; 1214) into the plurality of sub-beams 715. The sub-beams 715 are guided (1216) parallel to one another in the second plurality of waveguides 717. Portions of the sub-beams 715 are out-coupled (1218) to form a second array of out-coupled sub-beam portions. The method 1200 may be performed with any of the waveguide illuminators considered herein.

Figure 13:
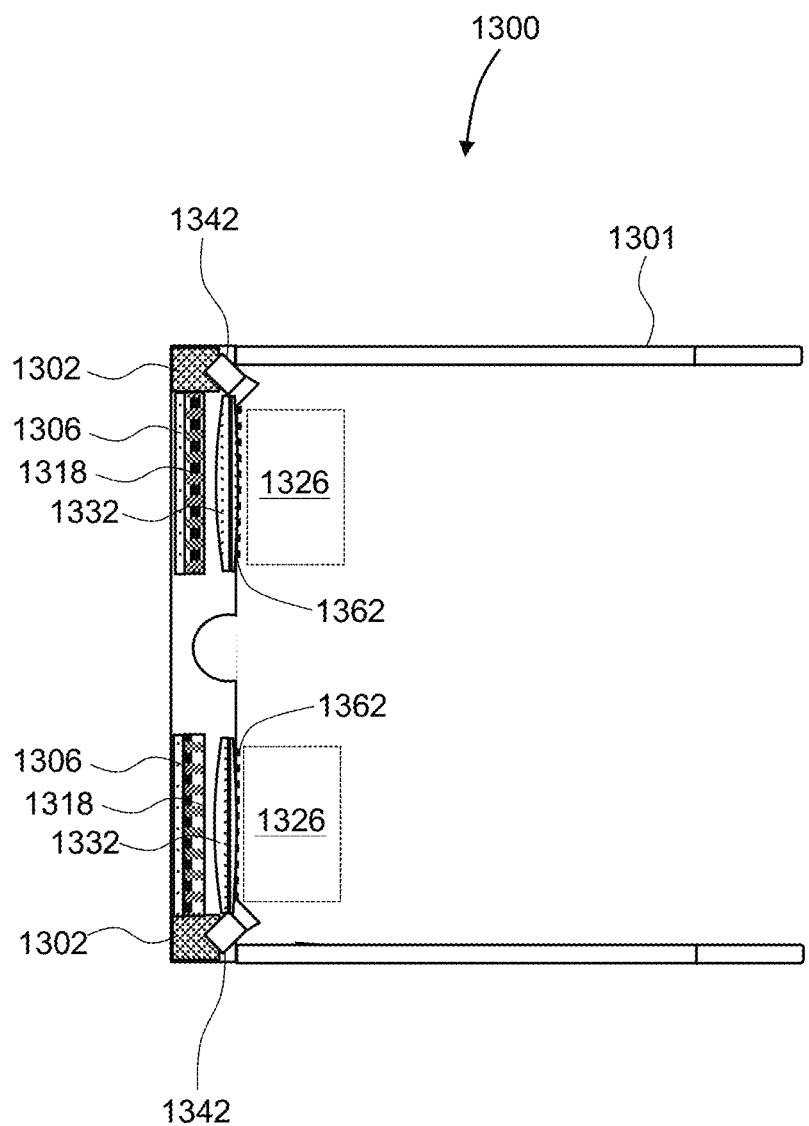
FIG. 13 is a view of an augmented reality (AR) display of this disclosure having a form factor of a pair of eyeglasses.

Turning to FIG. 13, a virtual reality (VR) near-eye display 1300 includes a frame 1301 supporting, for each eye: a light source 1302; a waveguide illuminator 1306 operatively coupled to the light source 1302 and including any of the waveguide illuminators disclosed herein; a display panel 1318 including an array of display pixels, where positions of the out-coupling gratings in the waveguide illuminator 1306 are coordinated with positions of the polarization-tuning pixels of the display panel 1318; and an ocular lens 1332 for converting the image in linear domain generated by the display panel 1318 into an image in angular domain for direct observation at an eyebox 1326. A plurality of eyebox illuminators 1362, shown as black dots, may be placed onto the side of the waveguide illuminator 1306 that faces the eyebox 1326. An eye-tracking camera 1342 may be provided for each eyebox 1326.

The purpose of the eye-tracking cameras 1342 is to determine position and/or orientation of both eyes of the user. The eyebox illuminators 1362 illuminate the eyes at the corresponding eyeboxes 1326, allowing the eye-tracking cameras 1342 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1362, the latter may be made to emit light invisible to the user. For example, infrared light may be used to illuminate the eyeboxes 1326.

Figure 14:
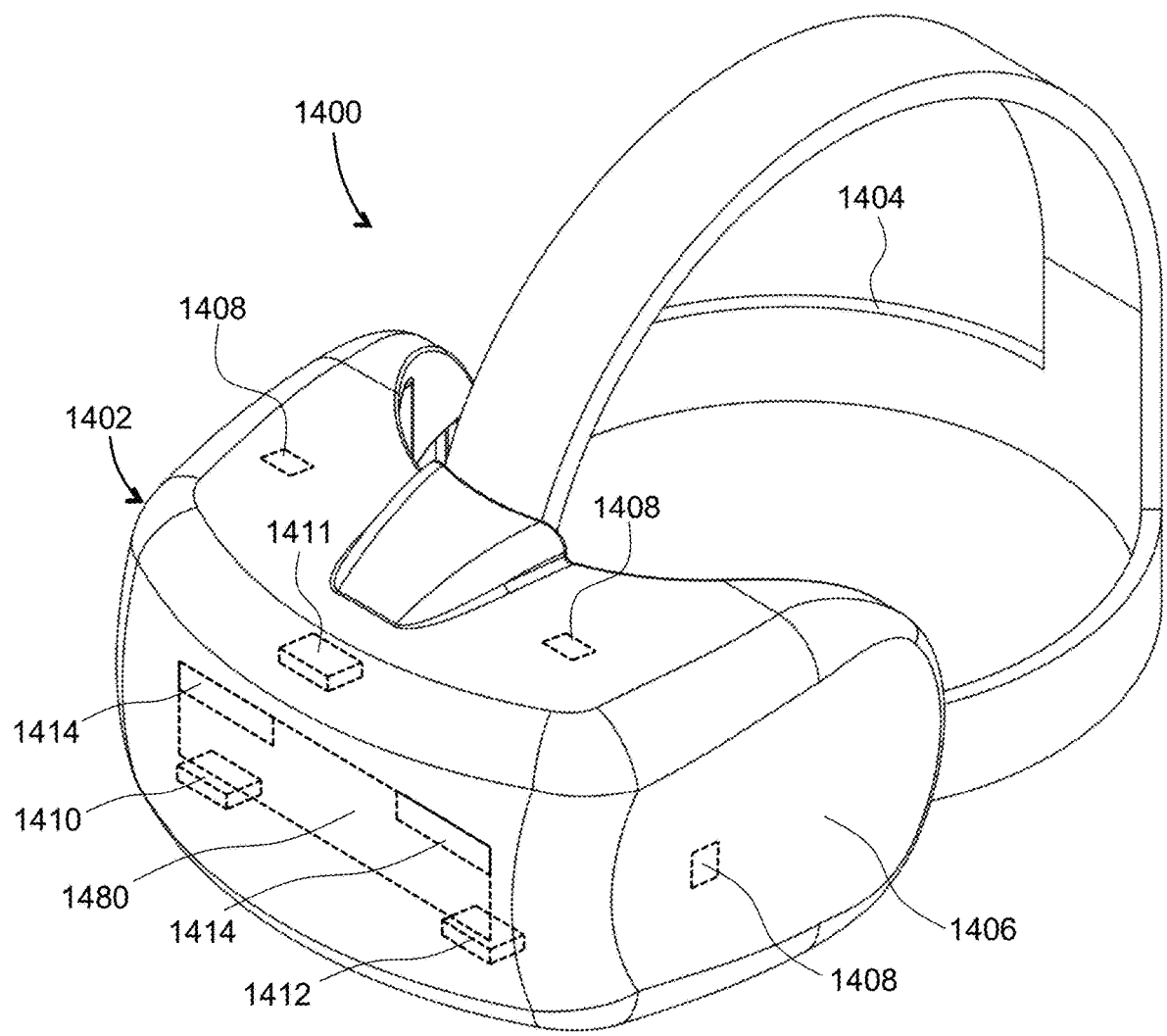
FIG. 14 is a three-dimensional view of a head-mounted display (HMD) of this disclosure.

Turning to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and illuminators disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide illuminator comprising:
    a first input waveguide for guiding a first input light beam therein;
    a first waveguide splitter coupled to the first input waveguide for splitting the first input light beam into a first plurality of sub-beams;
    a first waveguide array coupled to the first waveguide splitter for propagating the sub-beams of the first plurality, waveguides of the first waveguide array running parallel to one another, wherein each waveguide of the first waveguide array is configured to guide a sub-beam of the first plurality from the first waveguide splitter to an end of the waveguide; and
    a first array of rows of out-couplers, each row of out-couplers of the first array being coupled to a waveguide of the first waveguide array along a length of the waveguide, for out-coupling portions of the sub-beam propagating in the waveguide, to form a first two-dimensional array of sub-beam portions out-coupled from the first waveguide array.

2. The waveguide illuminator of claim 1, wherein the out-couplers of each row of the first array of rows of out-couplers have an out-coupling efficiency gradually increasing with distance from the first waveguide splitter, for flattening a spatial distribution of optical power of the first two-dimensional array of the out-coupled sub-beam portions.

3. The waveguide illuminator of claim 2, wherein:
the out-couplers of the first array of rows of out-couplers comprise grating out-couplers; and
the grating out-couplers have at least one of a grating duty cycle or a grating height varying with the distance from the first waveguide splitter, for flattening the spatial distribution of the optical power of the first two-dimensional array of out-coupled sub-beam portions.

4. The waveguide illuminator of claim 2, wherein the waveguides of the first waveguide array have a thickness adiabatically decreasing with the distance from the first waveguide splitter, for flattening the spatial distribution of the optical power of the first two-dimensional array of out-coupled sub-beam portions.

5. The waveguide illuminator of claim 2, wherein:
the out-couplers of the first array of rows of out-couplers comprise grating out-couplers; and
the grating out-couplers have a grating length varying with the distance from the first waveguide splitter, for flattening the spatial distribution of the optical power of the first two-dimensional array of out-coupled sub-beam portions.

6. The waveguide illuminator of claim 2, wherein:
the out-couplers of the first array of rows of out-couplers comprise grating out-couplers; and
a ratio of a lateral width of the grating out-couplers to a width of the waveguides varies with the distance from the first waveguide splitter, for flattening the spatial distribution of the optical power of the first two-dimensional array of out-coupled sub-beam portions.

7. The waveguide illuminator of claim 1, further comprising:
a second input waveguide for guiding a second input light beam therein;
a second waveguide splitter coupled to the second input waveguide for splitting the second input light beam into a second plurality of sub-beams;
a second waveguide array coupled to the second waveguide splitter for propagating the sub-beams of the second plurality, waveguides of the second waveguide array running parallel to one another, wherein each waveguide of the second waveguide array is configured to guide a sub-beam of the second plurality; and
a second array of rows of out-couplers, each row of out-couplers of the second array being coupled to a waveguide of the second waveguide array along a length of the waveguide, for out-coupling portions of the sub-beam propagating in the waveguide, to form a second two-dimensional array of out-coupled sub-beam portions;
wherein the first and second waveguide arrays are interleaved; and
wherein in operation, the sub-beams of the first and second pluralities propagate in opposite directions.

8. The waveguide illuminator of claim 1, further comprising a reflector at the ends of the waveguides of the first waveguide array, for reflecting the sub-beams to propagate back towards the first waveguide splitter.

9. The waveguide illuminator of claim 8, wherein the reflector runs across the waveguides of the first waveguide array and comprises at least one of a Bragg reflector or a metal-coated etched groove mirror.

10. The waveguide illuminator of claim 1, further comprising:
first, second, and third in-couplers for coupling into the waveguide illuminator light of first, second, and third color channels respectively; and
a wavelength multiplexor coupled to the first, second, and third in-couplers for combining the light of the first, second, and third color channels into the first input light beam, and for coupling the first input light beam into the first input waveguide;
wherein the first waveguide splitter comprises:
a 1×N splitter for splitting the first input light beam into N portions each propagating in one of N output waveguides, wherein N is an integer; and
N wavelength demultiplexors each coupled to a particular one of the N output waveguides, for separating light of the first, second, and third color channels to propagate in different waveguides of the first waveguide array.

11. A display device comprising:
a waveguide illuminator comprising:
an input waveguide for guiding an input light beam therein;
a waveguide splitter coupled to the input waveguide for splitting the input light beam into a plurality of sub-beams;
a waveguide array coupled to the waveguide splitter for propagating the sub-beams therein, waveguides of the waveguide array running parallel to one another, wherein each waveguide of the waveguide array is configured to guide a sub-beam of the plurality of sub-beams therein from the waveguide splitter to an end of the waveguide; and
an array of rows of out-couplers, each row of out-couplers being coupled to a waveguide of the waveguide array along a length of the waveguide, for out-coupling portions of the sub-beam propagating in the waveguide, to form a two-dimensional array of sub-beam portions out-coupled from the waveguide array; and
a display panel comprising an array of display pixels disposed and configured to receive the array of the out-coupled sub-beam portions.

12. The display device of claim 11, wherein the out-couplers of each row of the array of rows of out-couplers have an out-coupling efficiency gradually increasing with distance from the waveguide splitter, for flattening a spatial distribution of optical power of the two-dimensional array of the out-coupled sub-beam portions.

13. The display device of claim 12, wherein:
the out-couplers of the array of rows of out-couplers comprise grating out-couplers; and
the grating out-couplers have at least one of a grating duty cycle, a grating width, or a grating height varying with the distance from the waveguide splitter, for flattening the spatial distribution of the optical power of the two-dimensional array of out-coupled sub-beam portions.

14. The display device of claim 11, wherein a pitch of the display pixels is substantially equal to a pitch of the array of rows of out-couplers.

15. The display device of claim 11, further comprising a light source for providing the input light beam to the input waveguide.

16. The display device of claim 15, wherein the light source is a polarized light source, wherein the input light beam and the out-coupled sub-beam portions are polarized;

wherein the array of display pixels comprises an array of tunable polarization rotators for tuning polarization of individual sub-beam portions.

17. The display device of claim 15, wherein the light source comprises a monochromatic light source, wherein the input light beam has a wavelength of a first color channel.

18. A method for illuminating a display panel, the method comprising:
- guiding a first input light beam in a first input waveguide of a waveguide illuminator;
- splitting the first input light beam into a first plurality of sub-beams using a first waveguide splitter;
- guiding the first plurality of sub-beams parallel to one another in a first waveguide array of the waveguide illuminator; and
- out-coupling portions of the sub-beams of the first plurality using a first array of rows of out-couplers, each row of out-couplers being coupled to a waveguide of the first waveguide array, to form a first two-dimensional array of out-coupled sub-beam portions.

19. The method of claim 18, wherein the out-couplers of each row of the first array of rows of out-couplers have an out-coupling efficiency gradually increasing with distance from the first waveguide splitter, for flattening a spatial distribution of optical power of the first two-dimensional array of out-coupled sub-beam portions.

20. The method of claim 18, further comprising:
- guiding a second input light beam in a second input waveguide of the waveguide illuminator;
- splitting the second input light beam into a second plurality of sub-beams using a second waveguide splitter;
- guiding the second plurality of sub-beams parallel to one another in a second waveguide array of the waveguide illuminator; and
- out-coupling portions of the sub-beams of the second plurality using a second array of rows of out-couplers, each row of out-couplers being coupled to a waveguide of the second waveguide array, to form a second two-dimensional array of out-coupled sub-beam portions;
- wherein the first and second waveguide arrays are interleaved; and
- wherein the sub-beams of the first and second pluralities of sub-beams propagate in opposite directions.

* * * * *